United States Patent
Bonen et al.

(10) Patent No.: US 10,063,455 B2
(45) Date of Patent: Aug. 28, 2018

(54) OBTAINING INTERNET PROTOCOL SUBNET SCOPE

(71) Applicant: Harmonic Inc., San Jose, CA (US)

(72) Inventors: Adi Bonen, Belle Mead, NJ (US); Amir Leventer, Kfar Saba (IL)

(73) Assignee: Harmonic, Inc., San Jose, CA (US)

( * ) Notice: Subject to any disclaimer, the term of this patent is extended or adjusted under 35 U.S.C. 154(b) by 710 days.

(21) Appl. No.: 14/171,936

(22) Filed: Feb. 4, 2014

(65) Prior Publication Data

US 2015/0222521 A1    Aug. 6, 2015

(51) Int. Cl.
| H04L 12/751 | (2013.01) |
| H04L 12/721 | (2013.01) |
| H04L 12/741 | (2013.01) |

(52) U.S. Cl.
CPC .............. H04L 45/02 (2013.01); H04L 45/66 (2013.01); H04L 45/74 (2013.01)

(58) Field of Classification Search
CPC ......... H04L 45/02; H04L 45/66; H04L 45/74; H04L 12/751; H04L 12/721; H04L 12/28; H04L 12/56; H04L 12/26; H04L 29/12; H04J 3/16; H04J 3/22; H04Q 7/24; H04B 3/46; H04N 7/173
See application file for complete search history.

(56) References Cited

U.S. PATENT DOCUMENTS

| 2003/0145075 A1* | 7/2003 | Weaver | H04B 3/46 709/223 |
| 2003/0172170 A1* | 9/2003 | Johnson | H04L 61/2015 709/230 |
| 2006/0041815 A1 | 2/2006 | Haymond | |
| 2008/0126540 A1* | 5/2008 | Zeng | H04L 12/2801 709/225 |
| 2009/0125957 A1* | 5/2009 | Singh | H04N 21/41 725/111 |
| 2011/0310941 A1 | 12/2011 | Kenington | |
| 2015/0148074 A1 | 5/2015 | Phan et al. | |

* cited by examiner

*Primary Examiner* — Kwang B Yao
*Assistant Examiner* — Hardikkumar Patel
(74) *Attorney, Agent, or Firm* — Brokaw Patent Law PC; Christopher J. Brokaw

(57) ABSTRACT

A method for obtaining and utilizing internet protocol (IP) subnet information, the method may include obtaining by a layer two cable modem termination system (L2 CMTS) information about IP subnets that comprise DHCP leased IP addresses assigned to devices serviced by the L2 CMTS; and maintaining, by the L2 CMTS and based on the information about the IP subnets, a data structure that reflects the IP subnets that comprise the IP addresses that are allocated to the devices serviced by the L2 CMTS.

21 Claims, 2 Drawing Sheets

OBTAINING INTERNET PROTOCOL SUBNET SCOPE

BACKGROUND OF THE INVENTION

Under the Data Over Cable Service Interface Specification (DOCSIS) standard, a Layer 3 forwarding Cable Modem Termination System (L3 CMTS) manages the access to a plurality of subscriber cable modems and devices connected to the cable modems. Each cable modem (CM) and devices behind it get an Internet Protocol (IP) address through the L3 CMTS. These IP addresses normally belong to IP subnets which are possessed by the L3 CMTS. Thus the L3 CMTS is configured with a plurality of IP subnets, and is in charge of the access to all the devices in these subnets.

An external server has a need to dynamically create a flow to a subscriber (e.g., voice calls, video sessions). The server needs to establish quality of service (QoS) parameters for this flow to guarantee that the service is properly delivered over the DOCSIS shared access domain to the subscriber. In another example, a different server requires tapping data traffic to a specific subscriber for purpose of Lawful Intercept (LI). In both cases the server has to communicate/negotiate with the entity in charge of the access to that subscriber: the L3 CMTS. The server has to find out which of the plurality of L3 CMTS units in belonging to the service provider (Cable operator) is in charge of the access to the particular subscriber associated with the flow/LI.

Rather than inquiring with every possible L3 CMTS each time that a new dynamic session is needed, the server maintains a database of the IP subnet scope handled by all L3 CMTS units, searches for the IP address of the particular subscriber in that database, and identifies the L3 CMTS in charge of access to that subscriber. Since the service provider may occasionally change the subnets handled by each L3 CMTS, the server has to update that database periodically. Thus, the server can periodically query each and every L3 CMTS for the subnet scopes that they handle, and each L3 CMTS units provide its subnet scope information according to the configuration it received.

Alternative methods exist to query a L3 CMTS for its IP subnets scopes. Example for such methods is SNMP, which requires a-priori knowledge of the L3 CMTS own IP address. A second example is the Control Point Discovery protocol (CPD) specified by Cablelabs, which does not require a priori knowledge of the L3 CMTS own IP address but also enable a server to query a L3 CMTS for its IP subnets scopes.

A layer 2 forwarding CMTS (L2 CMTS) is also permitted under the DOCSIS spec. Such L2 CMTS works in conjunction with an Edge Router (ER) to provide equivalent service to a L3 CMTS. In such a case, the configuration of the IP subnets the L2 CMTS is in charge of access to is provided to the ER and not to the L2 CMTS. Although the configuration can be provided to both devices, it is highly desired not to duplicate redundant configuration since it requires more operations and may results in errors. There exists a problem where the L2 CMTS needs to obtain the subnet information for the DOCSIS shared domain it controls the access to, so that information can be communicated to external servers requiring it. While the ER has this information, it is not the access control point and cannot be communicated with in order to establish dynamic flows.

SUMMARY

According to an embodiment of the invention there may be provided a system, a computer readable medium and a method.

According to an embodiment of the invention there may be provided a method for obtaining and utilizing internet protocol (IP) subnet information, the method may include obtaining by a layer two cable modem termination system (L2 CMTS) information about IP subnets that comprise Dynamic Host Configuration Protocol (DHCP) leased IP addresses assigned to devices serviced by the L2 CMTS; and maintaining, by the L2 CMTS and based on the information about the IP subnets, a data structure that reflects the IP subnets that comprise the IP addresses that may be allocated to the devices serviced by the L2 CMTS.

The devices serviced by the L2 CMTS may be cable modems.

The devices serviced by the L2 CMTS may be cable modems and additional devices coupled to the cable modems.

The maintaining of information about the IP subnets may include relaying, by the L2 CMTS, DHCP messages between devices serviced by the L2 CMTS and at least one DHCP server, wherein a DHCP message exchanged between a device serviced by the L2 CMTS and a DHCP server may include (a) an IP address dynamically allocated to the device by the DHCP server, and (b) an IP subnet identifier that identifies an IP subnet that may include the device IP address.

The method further may include establishing by the L2 CMTS a status of a DHCP relay agent.

The method further may include receiving a request, from a requesting entity, related to IP subnets serviced by the L2 CMTS, retrieving from the data structure information related to the IP subnets serviced by the L2 CMTS; and sending to the requesting entity a response indicative of the information related to the IP subnets serviced by the L2 CMTS.

The method further may include receiving a request, from a requesting entity, related to an IP address of a device serviced by the L2 CMTS; and sending a response with information related to the IP subnet comprising the IP address of the device.

The maintaining of information about the IP subnets may include requesting by the L2 CMTS and from a layer three (L3) edge router information about the IP subnets that comprise leased IP addresses assigned to devices serviced by the L2 CMTS and receiving by the L2 CMTS the information about the IP subnets.

According to an embodiment of the invention there may be provided a layer two cable modem termination system (L2 CMTS) that may include (a) a communication module and extraction modules that may be arranged to obtain information about Internet protocol (IP) subnets that comprise Dynamic Host Configuration Protocol (DHCP) leased IP addresses assigned to devices serviced by the L2 CMTS; and (b) a data structure generator that may be arranged to maintain, based on the information about the IP subnets, a data structure that reflects the IP subnets that comprise the IP addresses that may be allocated to the devices serviced by the L2 CMTS.

The devices serviced by the L2 CMTS may be cable modems.

The devices serviced by the L2 CMTS may be cable modems and additional devices coupled to the cable modems.

The communication module may be arranged to relay DHCP messages between devices serviced by the L2 CMTS and at least one DHCP server, wherein a DHCP message exchanged between a device serviced by the L2 CMTS and a DHCP server may include (a) an IP address dynamically allocated to the device by the DHCP server, and (b) an IP subnet identifier that identifies an IP subnet that may include the device IP address.

The L2 CMTS further arranged to establish a status of a DHCP relay agent.

The communication module may be further arranged to receive a request, from a requesting entity, related to IP subnets serviced by the L2 CMTS, retrieve from the data structure information related to the IP subnets serviced by the L2 CMTS; and send to the requesting entity a response indicative of the information related to the IP subnets serviced by the L2 CMTS.

The communication module may be arranged to receive a request, from a requesting entity, related to an IP address of a device serviced by the L2 CMTS; and send a response with information related to the IP subnet comprising the IP address of the device.

The communication module may be arranged to request from a layer three edge router information about the IP subnets that comprise leased IP addresses assigned to devices serviced by the L2 CMTS and receive by the L2 CMTS the information about the IP subnets.

According to an embodiment of the invention there may be provided a non-transitory computer readable medium that stores instructions that once executed by a computer of a layer two cable modem termination system (L2 CMTS) cause the computer of the L2 CMTS to perform the stages of obtaining information about IP subnets that comprise Dynamic Host Configuration Protocol (DHCP) leased IP addresses assigned to devices serviced by the L2 CMTS; and maintaining, based on the information about the IP subnets, a data structure that reflects the IP subnets that comprise the IP addresses that may be allocated to the devices serviced by the L2 CMTS.

The devices services by the L2 CMTS may be cable modems.

The devices services by the L2 CMTS may be cable modems and additional devices coupled to the cable modems.

The non-transitory computer readable medium may store instructions for relaying, by the L2 CMTS, DHCP messages between devices serviced by the L2 CMTS and at least one DHCP server, wherein a DHCP message exchanged between a device serviced by the L2 CMTS and a DHCP server may include (a) an IP address dynamically allocated to the device by the DHCP server, and (b) an IP subnet identifier that identifies an IP subnet that may include the device IP address.

The non-transitory computer readable medium may store instructions for establishing by the L2 CMTS a status of a DHCP relay agent.

The non-transitory computer readable medium may store instructions for receiving a request, from a requesting entity, related to IP subnets serviced by the L2 CMTS, retrieving from the data structure information related to the IP subnets serviced by the L2 CMTS; and sending to the requesting entity a response indicative of the information related to the IP subnets serviced by the L2 CMTS.

The non-transitory computer readable medium may store instructions for receiving a request, from a requesting entity, related to an IP address of a device serviced by the L2 CMTS; and sending a response with information related to the IP subnet comprising the IP address of the device.

The non-transitory computer readable medium may store instructions for requesting by the L2 CMTS and from a layer three (L3) edge router information about the IP subnets that comprise leased IP addresses assigned to devices serviced by the L2 CMTS and receiving by the L2 CMTS the information about the IP subnets.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
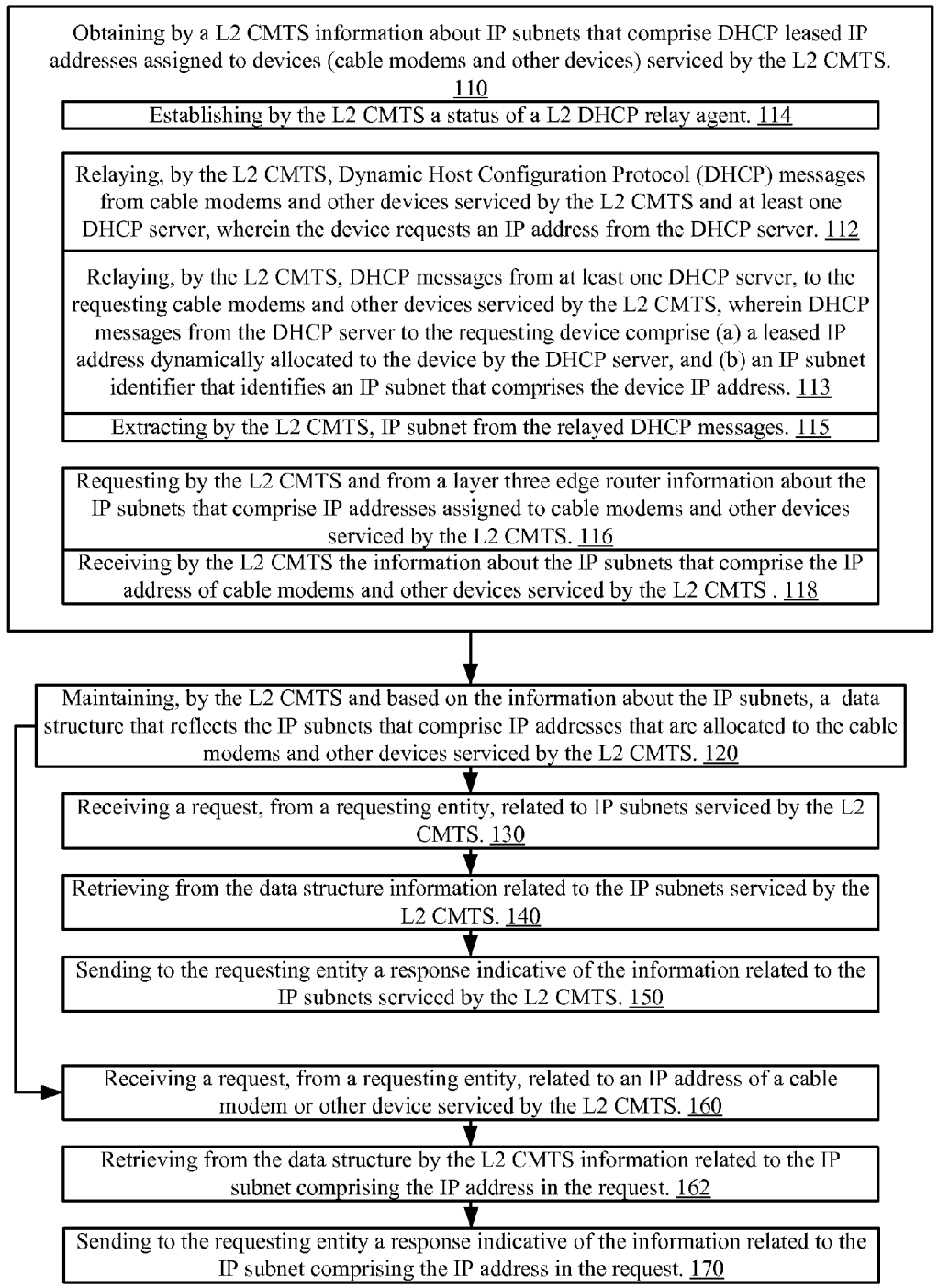
FIG. 1 illustrates a method according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and to a computer readable medium that stores instructions for executing the method.

Any reference in the specification to a system should be applied mutatis mutandis to a method that may be executed by the system and to a computer readable medium that stores instructions that can be executed by the system.

According to an embodiment of the invention the L2 CMTS can establish itself as the relay of information by obtaining the required subnet information from the ER. Such can be performed through the ER SNMP interface. The L2 CMTS has to analyze the subnets handled by the ER and discover those associated with its own access since the ER may be working in conjunction with a plurality of L2 CMTS units. The L2 CMTS will periodically update the information obtained from the ER in case that ER's configuration has changed. When an external server queries the L2 CMTS for the subnet scope, the L2 CMTS will provide the information previously obtained from the router.

According to another embodiment of the invention the L2 CMTS can establish itself as the relay of information by gleaning the required subnet information from DHCP transactions performed by the devices it controls the access to. Each successful DHCP transaction results in a DHCP server providing (leasing) an IP address to the requesting device. Additional information in the DHCP Offer and DHCP acknowledge messages includes the subnet in which the leased IP address resides. The L2 CMTS may already have a need to glean DHCP messages for other functional reasons. Now the L2 CMTS collects the subnet information provided to each DHCP requesting device, cross correlates that information with prior information received to build a database of all the subnets it controls access to. The L2 CMTS controls ageing of entries in that database in the same way that it controls ageing of the IP address leases themselves, which enables changes in configurations to tale effect. When an external server queries the L2 CMTS for the scope of subnets it controls access to, the L2 CMTS will provide the information previously obtained from DHCP gleaning.

Figure 2:
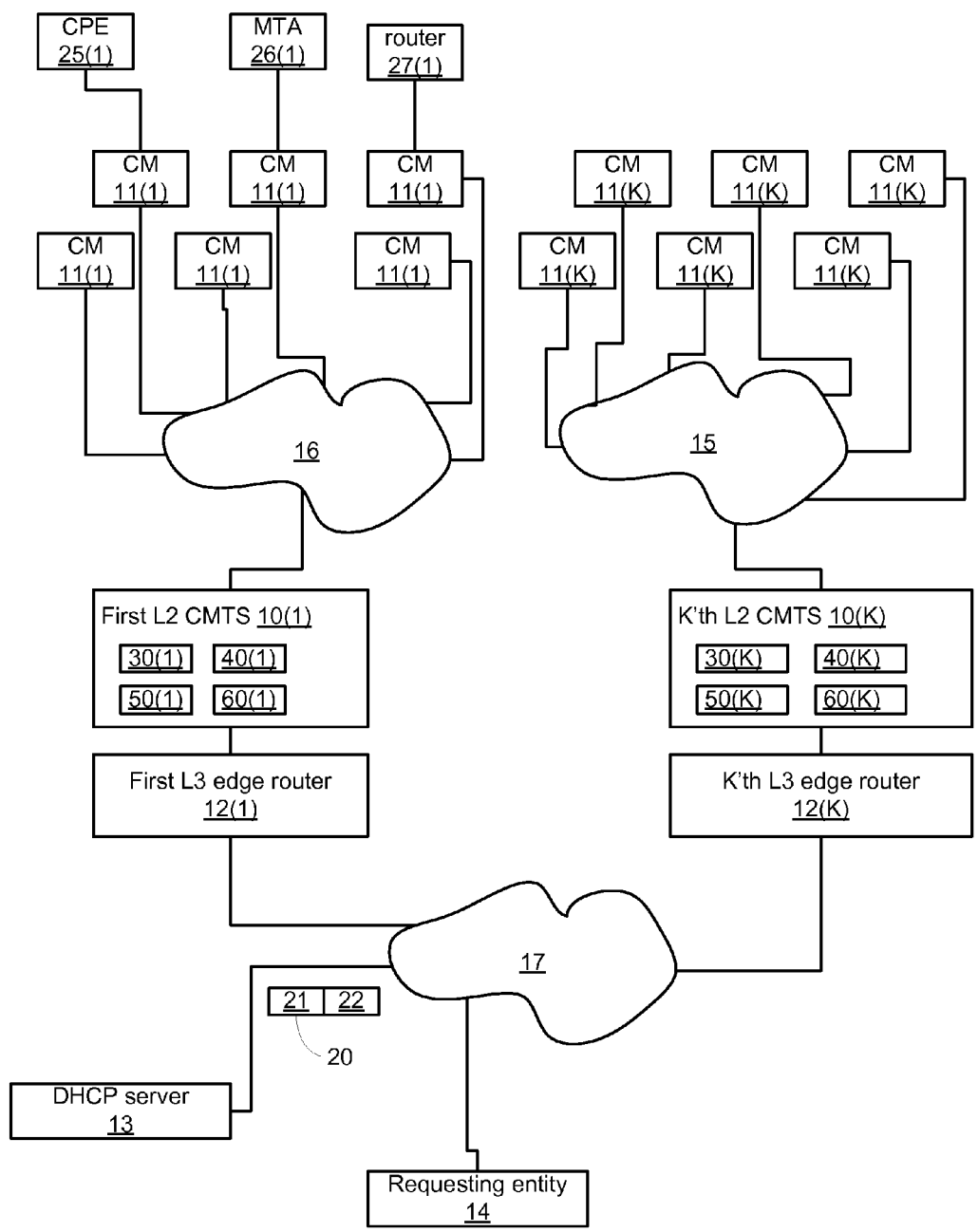
FIG. 2 illustrates various layer two CMTSs and their environment according to an embodiment of the invention.

FIG. 1 illustrates method 100 for obtaining and utilizing internet protocol (IP) subnet information, according to an embodiment the invention. FIG. 2 illustrates various layer two CMTSs and their environment according to an embodiment of the invention.

Method 100 may start by stage 110 of obtaining by a layer two cable modem termination system (L2 CMTS) information about IP subnets that comprise Dynamic Host Configuration Protocol (DHCP) leased IP addresses assigned to devices serviced by the L2 CMTS. The devices may include cable modems and other devices.

Referring to the example set forth in FIG. 2—first L2 CMTS 10(1) services cable modems (CM) 11(1) while K'th L2 CMTS 10(K) services cable modems 11(K). K being a positive integer. CMTS 10(1) is arranged to obtain information of IP subnets that include cable modem IP addresses of cable modems 10(1) and other devices 25(1), 26(1), 27 (1). CMTS 10(K) is arranged to obtain information of IP subnets that include cable modem IP addresses of cable modems 10(K) and other devices 25(K), 26(K), 27(K). First L2 CMTS 10(1) is coupled to cable modems 11(1) via network 16, is coupled to first layer three L3 edge router 12(1), and through edge router 12(1) is coupled (via network 17) to DHCP server 13, requesting entity 14 and other entities. K'th L2 CMTS 10(K) is coupled to cable modems 11(K) via network 15 and is coupled to K'th layer three edge router 12(K). The other devices are coupled to the cable modems and may be positioned downstream of the cable modems. Non-limiting examples of such other devices include MTA (Multimedia Terminal Adapter), subscriber router, CPE (Customer-premises equipment), eMTA and erouter embedded in the cable modem (e stands for Embedded), and various other devices. Most dynamically established flows are directed to devices other than the CM, which often have a totally different IP subnets than those assigned to CMs.

The L3 edge router may be acting as a L3 DHCP relay agent.

Referring back to FIG. 1—stage 110 may include establishing (114) by the L2 CMTS a status of a L2 DHCP relay agent.

Relaying (112), by the L2 CMTS, Dynamic Host Configuration Protocol (DHCP) messages from cable modems and other devices serviced by the L2 CMTS and at least one DHCP server, wherein the device request an IP address from the DHCP server.

Relaying (113), by the L2 CMTS, DHCP messages from at least one DHCP server, to the requesting cable modems and other devices serviced by the L2 CMTS, wherein DHCP messages from the DHCP server to the requesting device comprise (a) a leased IP address dynamically allocated to the device by the DHCP server, and (b) an IP subnet identifier that identifies an IP subnet that comprises the device IP address.

Referring to the example set forth in FIG. 2—first L2 CMTS 10(1) may be arranged to relay (113) DHCP messages exchanged between DHCP server 13 and any one of cable modems 11(1) and other devices 25(1), 26(1), 27(1). A non-limiting example of such as DHCP message is denoted 20 in FIG. 2 and includes multiple fields such as fields 21 and 22 that include the cable modem IP address and the IP subnet identifier. K'th L2 CMTS 10(K) may be arranged to relay DHCP messages exchanged between DHCP server 13 and any one of cable modems 11(K) and other devices 25(K), 26(K), 27(K). Although FIG. 2 illustrates a single DHCP server 13 there may be more than a single DHCP server that may exchange DHCP messages with cable modems 11(1) and 11(K) and other devices 25(1), 26(1), 27(1), 25(K), 26(K), 27(K).

The relaying of DHCP messages by the L2 CMTS (112), (113) allows the L2 CMTS to extract (115) the content of the DHCP messages (or at least the IP subnet identifier) and to update and/or build the data structure to reflect the content of the CMTS messages.

Stage 110 may include requesting (116) by the L2 CMTS and from a layer three edge router information about the IP subnets that comprise leased IP addresses assigned to cable modems and other devices serviced by the L2 CMTS and receiving (118) by the L2 CMTS the information about the IP subnets.

Referring to the example set forth in FIG. 2—first L2 CMTS 10(1) may request the information about the IP subnets from first L3 edge router 12(1) and K'th L2 CMTS 10(K) may request the information about the IP subnets from K'th L3 edge router 12(K). It is noted that a single edge router may serve more than a single L2 CMTS.

Stage 110 may be followed by stage 120 of maintaining, by the L2 CMTS and based on the information about the IP subnets, a data structure that reflects the IP subnets that comprise the IP addresses that are allocated to the cable modems and other devices serviced by the L2 CMTS.

The data structure of first L2 CMTS 10(1) and K'th L2 CMTS 10(K) are denoted 60(1) and 60(K) respectively. These data structures are generated and maintained by data structure generators 50(1) and 50(K) respectively. The relaying of DHCP messages or otherwise any reception and/or transmission of information related to the IP addresses and subnets are managed by communication modules denoted 40(1) and 40(K) respectively. The extraction of information from the DHCP or any other messages are executed by extraction modules denoted 30(1) and 30(K) respectively.

Stage 120 may be followed by stage 130 of receiving a request, from a requesting entity, related to IP subnets serviced by the L2 CMTS. This request can be generated in order to allow a requesting entity (such as an external server) to dynamically create a flow to a subscriber while fulfilling QoS parameters for this flow. The request may be directly received from the server that needs to dynamically create a flow or execute and LI functionality, or it can come from a different server as an intermediary. The different server may build a larger data structure.

Stage 130 may be followed by stage 140 of retrieving from the data structure information related to the IP subnets serviced by the L2 CMTS.

Stage 140 may be followed by stage 150 of sending to the requesting entity a response indicative of the information related to the IP subnets serviced by the L2 CMTS.

Stage 120 may be followed by stage 160 of receiving a request, from a requesting entity, related to an IP address of a cable modem serviced by the L2 CMTS.

Stage 160 may be followed by stage 162 of retrieving from the data structure information related to the IP subnet comprising the IP address in the request.

Stage 162 may be followed by stage 170 of sending a response indicative of the information related to the IP subnet comprising the IP address in the request.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for obtaining and utilizing internet protocol (IP) subnet information, comprising:
 a layer two cable modem termination system (L2 CMTS) receiving, from an edge router, one or more messages which identify (IP) subnets that comprise Dynamic Host Configuration Protocol (DHCP) leased IP addresses serviced by two or more layer two cable modem termination systems (L2 CMTSs), wherein said two or more L2 CMTSs include said L2 CMTS;
 said L2 CMTS determining which of said DHCP IP addresses, serviced by said two or more L2 CMTSs and identified by said one or more messages received from said edge router, are assigned to devices serviced by the L2 CMTS;
 the L2 CMTS maintaining electronic data records that identifies the IP subnets that comprise the IP addresses that are allocated to the devices serviced by the L2 CMTS;
 upon receiving a request, from a requesting entity, related to IP subnets serviced by the L2 CMTS, retrieving from the data structure information related to the IP subnets serviced by the L2 CMTS; and
 sending to the requesting entity a response indicative of the information related to the IP subnets serviced by the L2 CMTS.

2. The method according to claim 1, wherein the devices serviced by the L2 CMTS are cable modems.

3. The method according to claim 1, wherein the devices serviced by the L2 CMTS are cable modems and additional devices coupled to the cable modems.

4. The method according to claim 1, wherein maintaining said electronic data records comprises relaying, by the L2 CMTS, DHCP messages between devices serviced by the L2 CMTS and at least one DHCP server, wherein a DHCP message exchanged between a device serviced by the L2 CMTS and a DHCP server comprises (a) an IP address dynamically allocated to the device by the DHCP server, and (b) an IP subnet identifier that identifies an IP subnet that comprises the device IP address.

5. The method according to claim 1, further comprising: establishing by the L2 CMTS a status of a DHCP relay agent.

6. The method according to claim 1, further comprising: receiving a request, from a requesting entity, related to an IP address of a device serviced by the L2 CMTS; and sending a response with information related to the IP subnet comprising the IP address of the device.

7. The method according to claim 1, wherein the maintaining of information about the IP subnets comprises requesting by the L2 CMTS and from a layer three edge router information about the IP subnets that comprise leased IP addresses assigned to devices serviced by the L2 CMTS and receiving by the L2 CMTS the information about the IP subnets.

8. A layer two cable modem termination system (L2 CMTS) that comprises:
 one or more processors; and one or more non-transitory computer-readable storage mediums storing one or more sequences of instructions, which when executed by the one or more processors, cause:

the layer two cable modem termination system (L2 CMTS) receiving, from an edge router, one or more messages which identify Internet Protocol (IP) subnets that comprise Dynamic Host Configuration Protocol (DHCP) leased IP addresses serviced by two or more layer two cable modem termination systems (L2 CMTSs), wherein said two or more L2 CMTSs include said L2 CMTS;

said L2 CMTS determining which of said DHCP IP addresses, serviced by said two or more L2 CMTSs and identified by said one or more messages received from said edge router, are assigned to devices serviced by the L2 CMTS;

the L2 CMTS maintaining electronic data records that identifies the IP subnets that comprise the IP addresses that are allocated to the devices serviced by the L2 CMTS;

upon receiving a request, from a requesting entity, related to IP subnets serviced by the L2 CMTS, retrieving from the data structure information related to the IP subnets serviced by the L2 CMTS; and sending to the requesting entity a response indicative of the information related to the IP subnets serviced by the L2 CMTS.

9. The L2 CMTS according to claim 8, wherein the devices serviced by the L2 CMTS are cable modems.

10. The L2 CMTS according to claim 8, wherein the devices serviced by the L2 CMTS are cable modems and additional devices coupled to the cable modems.

11. The L2 CMTS according to claim 8, wherein maintaining said electronic data records comprises relaying DHCP messages between devices serviced by the L2 CMTS and at least one DHCP server, wherein a DHCP message exchanged between a device serviced by the L2 CMTS and a DHCP server comprises (a) an IP address dynamically allocated to the device by the DHCP server, and (b) an IP subnet identifier that identifies an IP subnet that comprises the device IP address.

12. The L2 CMTS according to claim 8, wherein execution of the one or more sequences of instructions further cause establishing a status of a DHCP relay agent.

13. The L2 CMTS according to claim 8, wherein execution of the one or more sequencing of instructions further cause:

receiving a request, from a requesting entity, related to an IP address of a device serviced by the L2 CMTS; and sending a response with information related to the IP subnet comprising the IP address of the device.

14. The L2 CMTS according to claim 8, wherein execution of the one or more sequences of instructions further cause:

requesting from a layer three edge router information about the IP subnets that comprise leased IP addresses assigned to devices serviced by the L2 CMTS; and receiving by the L2 CMTS the information about the IP subnets.

15. One or more non-transitory computer-readable storage mediums storing one or more sequences of instructions, which when executed by one or more processors, cause:

a layer two cable modem termination system (L2 CMTS) receiving, from an edge router, one or more messages which identify Internet Protocol (IP) subnets that comprise Dynamic Host Configuration Protocol (DHCP) leased IP addresses serviced by two or more layer two cable modem termination systems (L2 CMTSs), wherein said two or more L2 CMTSs include said L2 CMTS;

said L2 CMTS determining which of said DHCP IP addresses, serviced by said two or more L2 CMTSs and identified by said one or more messages received from said edge router, are assigned to devices serviced by the L2 CMTS;

the L2 CMTS maintaining electronic data records that identifies the IP subnets that comprise the IP addresses that are allocated to the devices serviced by the L2 CMTS;

upon receiving a request, from a requesting entity, related to IP subnets serviced by the L2 CMTS, retrieving from the data structure information related to the IP subnets serviced by the L2 CMTS; and sending to the requesting entity a response indicative of the information related to the IP subnets serviced by the L2 CMTS.

16. The non-transitory computer readable medium according to claim 15, wherein the devices serviced by the L2 CMTS are cable modems.

17. The non-transitory computer readable medium according to claim 15, wherein the devices serviced by the L2 CMTS are cable modems and additional devices coupled to the cable modems.

18. The non-transitory computer readable medium according to claim 15, wherein maintaining said electronic data records comprises relaying, by the L2 CMTS, DHCP messages between devices serviced by the L2 CMTS and at least one DHCP server, wherein a DHCP message exchanged between a device serviced by the L2 CMTS and a DHCP server comprises (a) an IP address dynamically allocated to the device by the DHCP server, and (b) an IP subnet identifier that identifies an IP subnet that comprises the device IP address.

19. The non-transitory computer readable medium according to claim 15, wherein execution of the one or more sequences of instructions further cause: establishing by the L2 CMTS a status of a DHCP relay agent.

20. The non-transitory computer readable medium according to claim 15, further comprising:

receiving a request, from a requesting entity, related to an IP address of a device serviced by the L2 CMTS; and sending a response with information related to the IP subnet comprising the IP address of the device.

21. The non-transitory computer readable medium according to claim 15, wherein the maintaining of information about the IP subnets comprises requesting by the L2 CMTS and from a layer three edge router information about the IP subnets that comprise leased IP addresses assigned to devices serviced by the L2 CMTS and receiving by the L2 CMTS the information about the IP subnets.

* * * * *